(12) United States Patent
Rees

(10) Patent No.: US 10,127,776 B2
(45) Date of Patent: Nov. 13, 2018

(54) CASH DRAWER AND WEIGHING MODULE

(71) Applicant: TELLERMATE LIMITED, Newport (GB)

(72) Inventor: Philip Ian Rees, Llantrisant (GB)

(73) Assignee: TELLERMATE LIMITED, Newport (GB)

( * ) Notice: Subject to any disclaimer, the term of this patent is extended or adjusted under 35 U.S.C. 154(b) by 11 days.

(21) Appl. No.: 15/263,061

(22) Filed: Sep. 12, 2016

(65) Prior Publication Data

US 2018/0075710 A1    Mar. 15, 2018

(51) Int. Cl.
*G01G 19/42*  (2006.01)
*G01G 19/52*  (2006.01)
*G07G 1/00*   (2006.01)

(52) U.S. Cl.
CPC ........... *G07G 1/0027* (2013.01); *G01G 19/42* (2013.01); *G01G 19/52* (2013.01); *G07G 1/0072* (2013.01)

(58) Field of Classification Search
CPC .. G07G 1/0027; G07G 1/0072; G01G 19/414; G01G 19/4144; G01G 19/42; G01G 19/52
See application file for complete search history.

(56) References Cited

U.S. PATENT DOCUMENTS

| | | | |
|---|---|---|---|
| 2,768,735 A | 10/1956 | Wallace | |
| 4,522,275 A | 6/1985 | Anderson | |
| 5,227,966 A | 7/1993 | Ichiba | |
| 5,397,264 A | 3/1995 | Gross | |
| 5,756,977 A | 5/1998 | Biss | |
| 5,992,959 A * | 11/1999 | Kawamoto | A47B 88/90 312/304 |
| 7,992,768 B2 * | 8/2011 | Benigno | G01G 19/414 235/379 |
| 8,141,772 B1 | 3/2012 | Folk et al. | |
| 9,460,589 B2 * | 10/2016 | Charij | G07G 1/0018 |
| 2008/0193452 A1 | 8/2008 | Meinwald et al. | |
| 2009/0045030 A1 | 2/2009 | Peart et al. | |
| 2009/0236431 A1 | 9/2009 | Benigno et al. | |
| 2013/0264916 A1 | 10/2013 | Rossi | |
| 2017/0162005 A1 | 6/2017 | Charij | |

FOREIGN PATENT DOCUMENTS

| | | |
|---|---|---|
| CA | 2034417 A | 7/1992 |
| GB | 2269088 A | 2/1994 |
| GB | 2417093 A | 2/2006 |
| GB | 2497368 A | 6/2013 |
| GB | 2514990 | 12/2014 |

(Continued)

*Primary Examiner* — Randy Gibson
(74) *Attorney, Agent, or Firm* — Adler Pollock & Sheehan P.C.; Daniel J. Holmander, Esq.

(57) ABSTRACT

A cash drawer has a weighing module comprising a plurality of cups; the cash drawer has a front and a rear. The cups are arranged such that four prone note cups, five coin cups and two vertical note cups are provided. The four prone note cups are arranged rearwards of the five coin cups and forwards of the two vertical note cups. A weighing module for a cash drawer is also provided, which comprises a plurality of note cups and coin cups arranged on respective load cells. At least some of the cups are movable relative to respective load cells on which they are arranged.

18 Claims, 13 Drawing Sheets

(56) References Cited

FOREIGN PATENT DOCUMENTS

| | | |
|---|---|---|
| JP | 0240795 A | 2/1990 |
| JP | 3215717 B2 | 10/2001 |
| JP | 2004326645 A | 11/2004 |
| JP | 2005063017 A | 3/2005 |
| WO | WO-9850895 A1 | 11/1998 |
| WO | WO-03082684 A3 | 1/2004 |
| WO | WO-04013818 A1 | 2/2004 |
| WO | WO-05041140 A1 | 5/2005 |
| WO | WO-05071623 A1 | 8/2005 |

* cited by examiner

CASH DRAWER AND WEIGHING MODULE

TECHNICAL FIELD OF THE INVENTION

The present technology relates to a cash drawer and a weighing module therefor, and especially, although not exclusively a cash drawer for a cash drawer unit for use with a separate Electronic Point Of Sale (EPOS) device. The cash drawer may also be for a cash register and in either case is most suitably a sliding cash drawer.

BACKGROUND TO THE INVENTION

Cash registers with sliding cash drawers have been well known for many years. More recently separate cash drawer units with sliding cash drawers or with flip top lids which reveal the cash drawer, for use with associated EPOS units have become increasingly widespread.

Cash drawers incorporating weighing modules are also known, for example, Tellermate Limited sell such cash drawers under the trade mark T-ICE. These drawers include a series of coin cups to receive different denominations of coins, together with vertically oriented note cups, to receive different denominations of notes. These vertically oriented note cups are considered suitable for countries where notes are easily distinguished without seeing their faces, for example by virtue of being different sizes and/or different colours. Vertical storage for notes is generally preferred because it can obviate the need for note clips and can take less space in the X and Y axes, allowing for narrow and/or less deep (front to back) drawers, sometimes at the expense of height (Z-axis).

Such an arrangement is, however, not considered suitable for other countries, such as USA, where notes of different denominations are the same size and colour, because it is too difficult to distinguish which notes should go in which of the different note cups without seeing the faces of the notes stored therein.

Typically in USA banknotes are arranged in a tray having five prone note cups each having its long axis extending front to back and having a clip to retain the notes therein. Coins are stored in 5 coin cups, one in front of each note cup. There are currently seven denominations of banknote in production and five denominations of coin. Consequently, whilst there is space for each coin to be stored separately, there is not space for each note. Accordingly, the most frequently used, and less valuable notes $1, $5, $10, $20 are generally stored in the cups in the tray and the more valuable, less frequently used notes ($100) are stored underneath the tray. $2 notes are so rare that provision is not normally made for them—if encountered, they can be stored with the $1 notes (or refused).

Such an arrangement cannot work with a cash drawer having a weighing module therein, because each cup is separate and fixedly attached to a load cell beneath it in order to ensure accurate weighing. In any case, for accurate weighing (and hence accurate determination of the value of currency stored in the drawer) it is necessary for each denomination of note to be stored in a respective cup.

This fixed attachment of each cup to its associated load cell has another disadvantage, in that, especially in a sliding drawer, the cups can be deliberately or inadvertently pulled by operators and this can damage the load cells leading to incorrect results or even the necessity to repair the drawer.

An object of the present technology is to provide an improved cash drawer.

SUMMARY OF THE INVENTION

According to a first aspect of the present technology there is provided a cash drawer having a weighing module comprising a plurality of cups; wherein the cash drawer has a front and a rear; the cups arranged such that four prone note cups, five coin cups and two vertical note cups are provided; the prone note cups being provided rearwards of the five coin cups and forwards of the two vertical note cups.

A prone note cup is a note cup intended and designed to receive notes lying flat (with their plane substantially horizontal). Each prone note cup may comprise a clip to clip down the notes. There may be only four prone note cups.

The prone note cups may have a long axis running perpendicular to the front and rear of the cash drawer.

A coin cup is intended and designed to receive coins. There may be only five coin cups.

A vertical note cup is intended and designed to receive notes with their plane substantially vertical, generally having their long axes substantially horizontal and their short axes substantially vertical. Typically a vertical note cup is taller than it is wide and longer than it is tall. There may be only two vertical note cups.

The vertical note cups may have a long axis extending parallel with the front and rear of the cash drawer.

The provision of vertical note cups towards the rear of the drawer means that a user tends to view the notes within the cups at a less acute angle than the cups towards the front or in the middle. Consequently, it is easier to see the contents of those cups. The vertical note cups are intended to receive high value, less frequently used notes, such as $50 and $100 notes. Consequently, they do not need to fit many notes in. Moreover, since most of the note cups, for most of the more frequently used denominations ($1, $5, $10 and $20) remain prone, in the event that the user cannot immediately see which of the notes goes in which vertical cup, he/she only has to remember which denominations go into two cups, which is a relatively straightforward task (no provision is made for $2 notes in view of their rarity). Additionally, since the high value denominations are infrequently used, it will be rare to have to spend extra time checking, if a user forgets which vertical note cup to place them into. A still further advantage of vertical cups is that it is more difficult for a would-be thief to grab notes from such cups (as they are thin) than from prone note cups and a yet further advantage is that placement of the vertical note cups at the rear of the drawer makes it more difficult for a would-be thief to reach in, and more obvious if a dishonest employee attempts to take out notes from these cups.

One perceived disadvantage of vertical note cups is that they have to be higher than traditional prone note cups (since the height is not merely determined by the highest stack of notes that will be received, but the width of a note); this means that the drawer containing the note must generally be higher. The inventor has determined that as a consequence of this greater depth, although the prone note cups must remain of a fixed width (sufficient to fit the width of the note therein), the coin cups can be adapted to fit the same number of coins in, whilst being narrower. Consequently, the width of the drawer can be reduced as five (narrower) coin cups can fit within a smaller space and the total width is determined by the width of the four prone note cups. Thus a more compact drawer can be produced, whilst still including a cup for each note (apart from the very rarely seen $2 note) and a cup for each coin.

According to a second aspect of the present technology there is provided a weighing module for a cash drawer comprising a plurality of note cups and coin cups arranged on respective load cells, where at least some of the cups are movable relative to respective load cells on which they are arranged.

The cups may be arranged as set out in relation to the first aspect of the present technology, including any of the optional features or combination of optional features.

Each cup may have a base and each respective load cell may be fixedly attached to a cup holder. Fixed attachment of the cup holder allows the location on which the weight will bear on the load cell to be accurately determined, despite the cup itself being moveable.

The weighing module may comprise a tray having cavities in which each cup is seated and apertures in the base, through which the cups are attached to their respective load cells. The tray may be arranged such that the cavities receive cups, but the cups do not touch the tray once seated on respective cup holders.

At least some of the cups, preferably coin cups, may be removable from respective load cells.

The base of each removable cup may have a formation mating with a formation on the cup holder.

The fit between the formations may be a transition fit or an interference fit. It is vital to accurate weighing that the interface between the coin cup and the load cell, hence between the removable cup and the removable cup holder and between the removable cup holder and the load cell, is reliable and consistent. Hence a close fit between the mating formations is advantageous.

Each removable cup holder may comprise a platform with a formation extending therefrom. The platform may provide a stable surface, whilst the formation may provide for a close fit when the cup is seated thereon. The formation on the coin cup holder may fit within the formation on the coin cup.

Providing a movable cup reduces the potential for users to pull on (and thereby damage) the respective load cell. Providing a removable cup allows for the cup to be removed without damage and allows for its contents to be weighed on a separate machine if required (e.g. for verification of the contents).

At least some of the cups, preferably the vertical note cups, may be movable relative to, but irremovable from their respective load cells.

It will be understood that an irremovably attached cup is neither intended nor suitable for removal and damage may be caused by removal. However, irremovable attachment, is not to be interpreted as permanent attachment, e.g. with a permanent bond.

The base of each irremovable cup may be attached to, but movable relative to the respective cup holder.

Each irremovable cup holder may comprise a platform on which the cup may be seated having one or more aperture therethrough and the irremovable cups may comprise one or more projections extending through the one or more apertures. The projections may be provided with clips to irremovably secure the irremovable cups to the respective cup holder whilst allowing relative movement.

The interface between the one or more projection and its respective aperture may be loose-fitting, but close fitting. This allows easy relative movement, but ensures accurate location.

This allows the cup holder to be pulled, without pulling on (and damaging) the load cell, whilst the irremovable connection keeps the cup attached to the holder, so that once pulling ceases it returns to the correct position, seated on the platform.

Each cup, cup holder and load cell may be arranged perpendicular to each other. The cup holder may be arranged to hold the primary axis of each cup perpendicular to the primary axis of the load cell, e.g. the (in-normal-use horizontal axis of the) beam of a strain gauge load cell may be held perpendicular to the (vertical in use) axis of the cup, in which currency is introduced).

This obviates any error at the base of the component stack (i.e. between load cell and holder, or cup and holder, being amplified and leading to the cup touching the tray in which it is held (which would lead to inaccurate measurement of the weight (and hence value) of the currency within).

The present technology extends to a cash drawer comprising the weighing module of the second aspect of the present technology including any optional features or combination of optional features, and any combination of features/optional features from the first and second aspects. The present technology further extends to a cash drawer unit (in particular a sliding cash drawer unit or a flip top cash drawer unit), or a cash register, comprising the cash drawer of the first aspect, and/or the weighing module of the second aspect optionally including and any optional feature, or combination of optional features.

DETAILED DESCRIPTION OF THE INVENTION

In order that the present technology may be more clearly understood an embodiment thereof will now be described, by way of example only, with reference to the accompanying drawings, of which:

Figure 1:
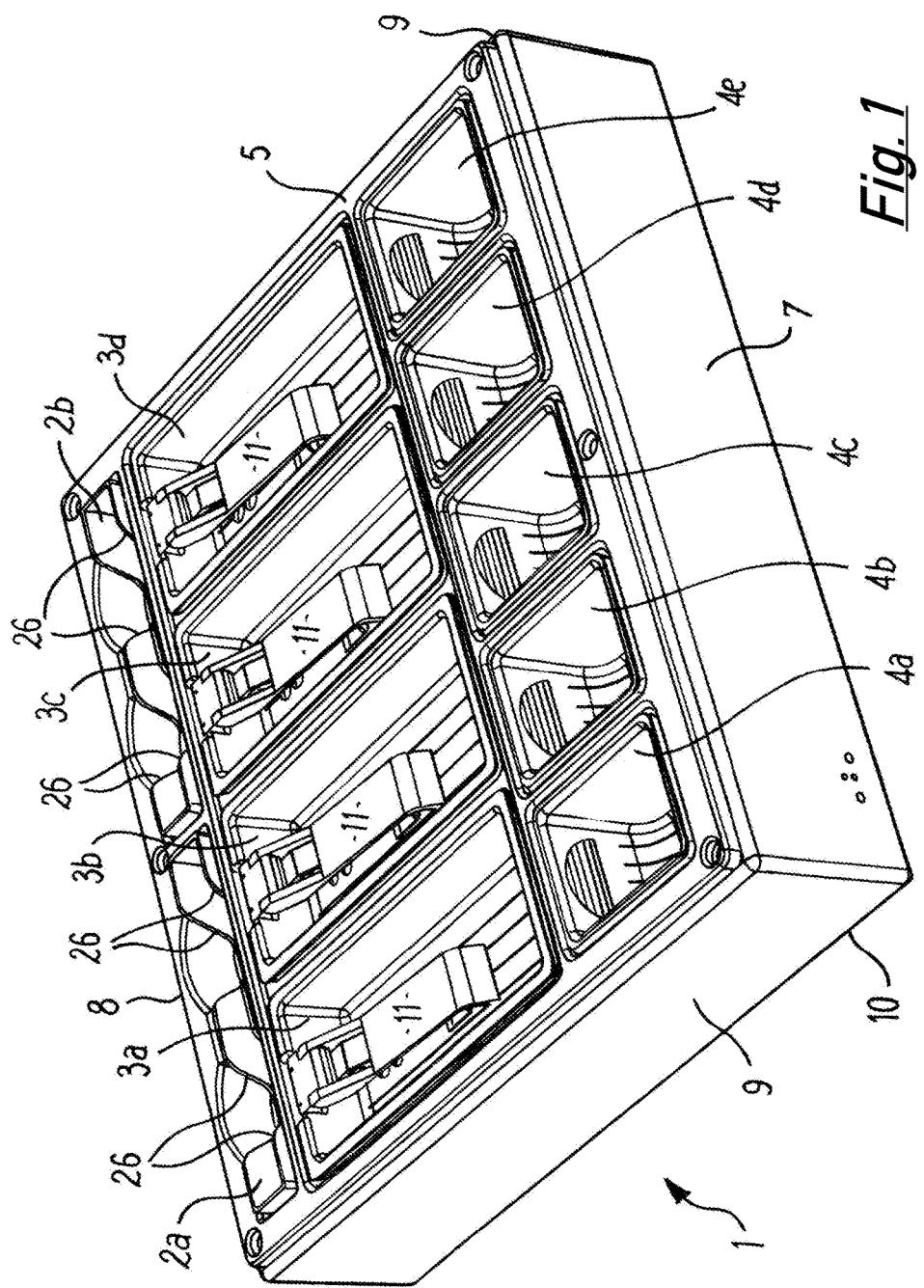
FIG. 1 shows perspective view of a cash drawer according to an embodiment of the present technology.
Figure 11:
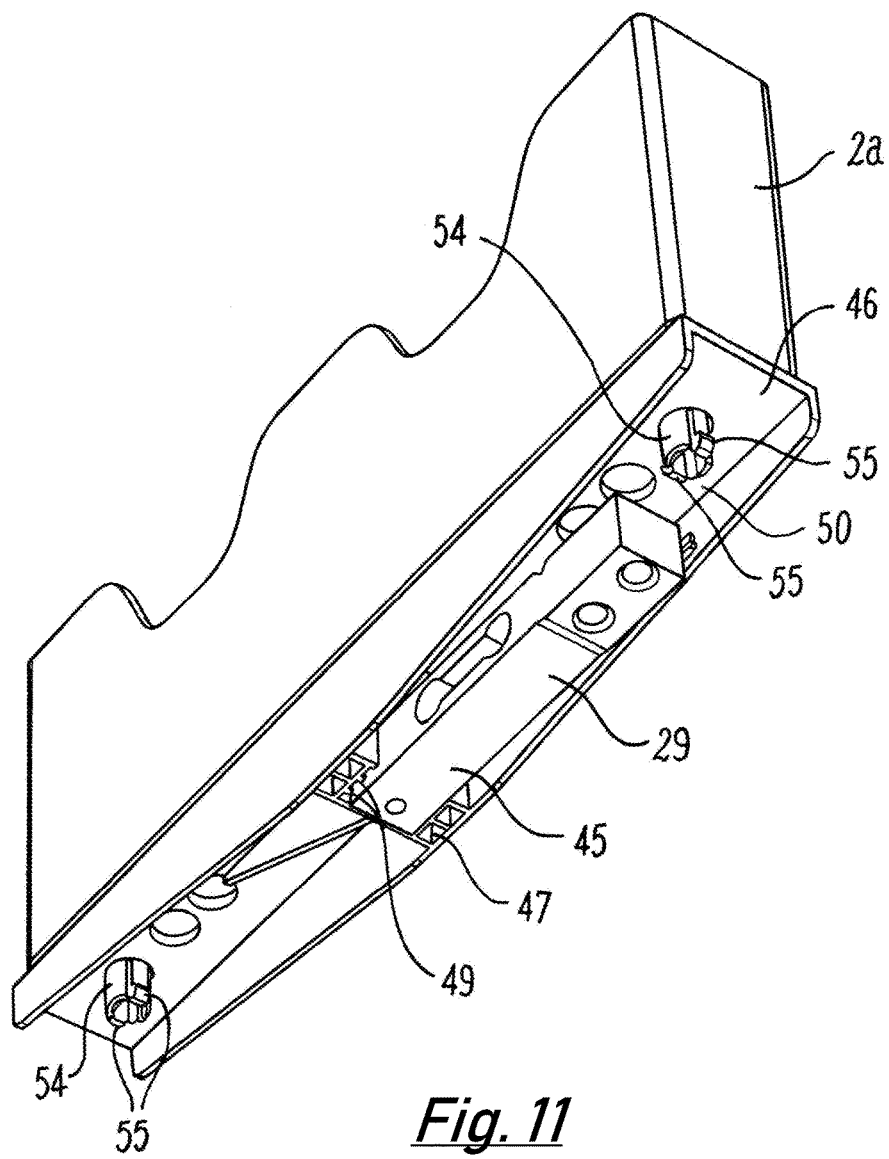
Figure 12:
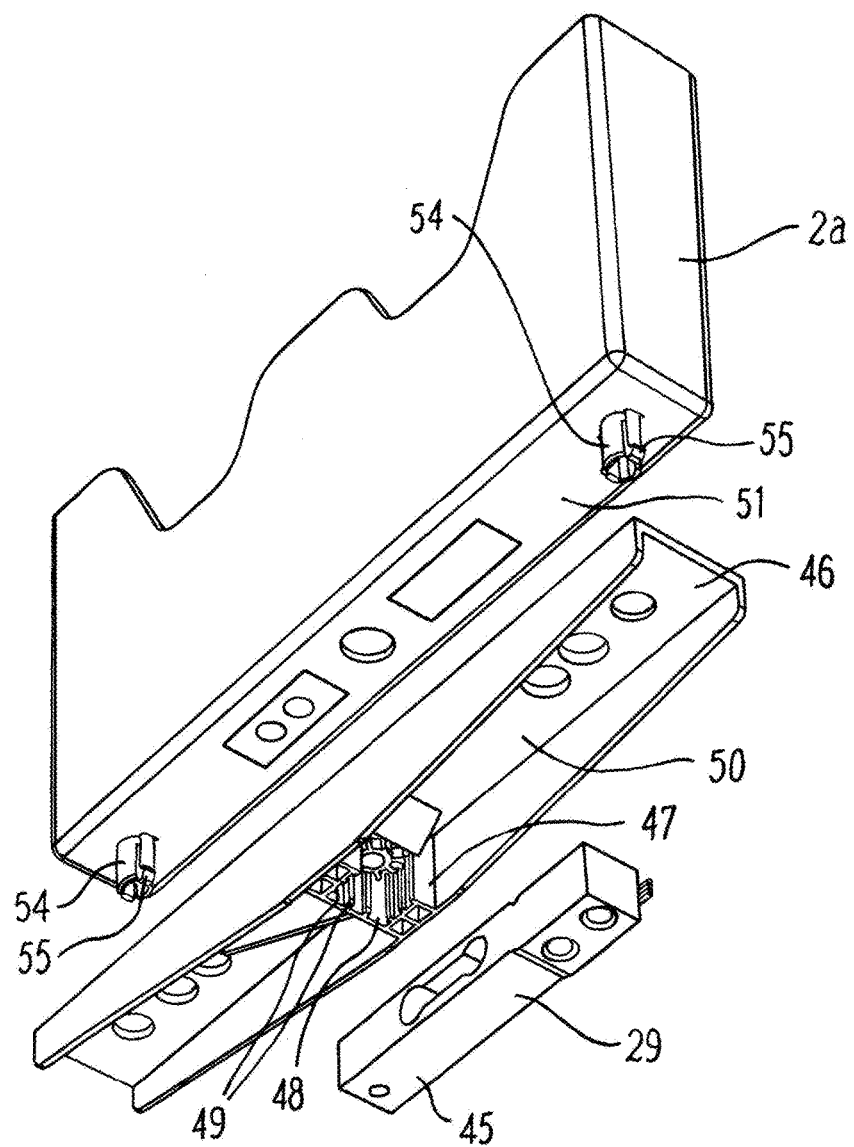
Figure 13:
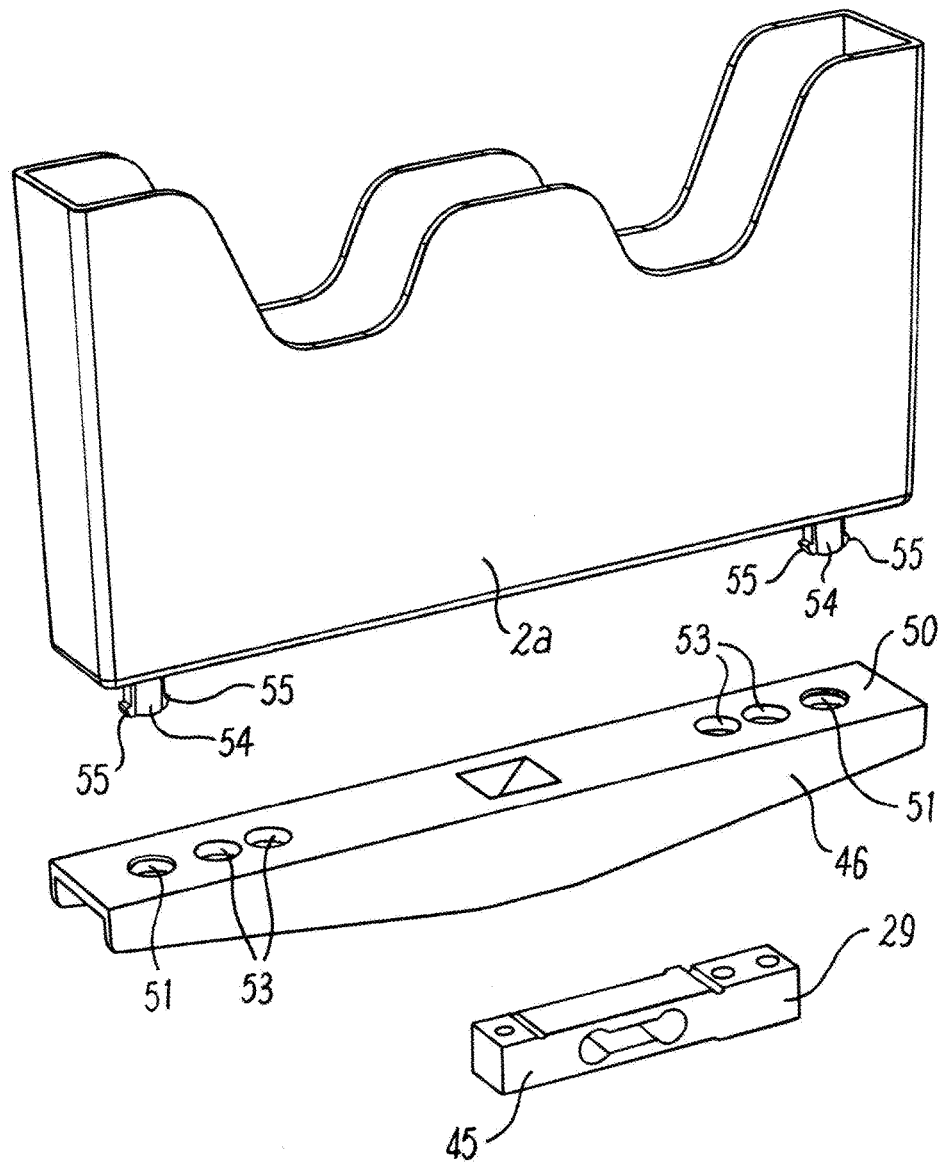

FIG. 11 shows an underneath perspective view of a vertical note cup, its load cell and the interfacing vertical note cup holder, of the weighing module of the cash drawer of FIG. 1 in the absence of other components FIG. 12 shows an exploded underneath perspective view of the vertical note cup, its load cell and the interfacing vertical note cup holder of FIG. 11; and FIG. 13 shows a front perspective view of the vertical note cup, its load cell and the interfacing vertical note cup holder of FIGS. 11 and 12.

Figure 6:
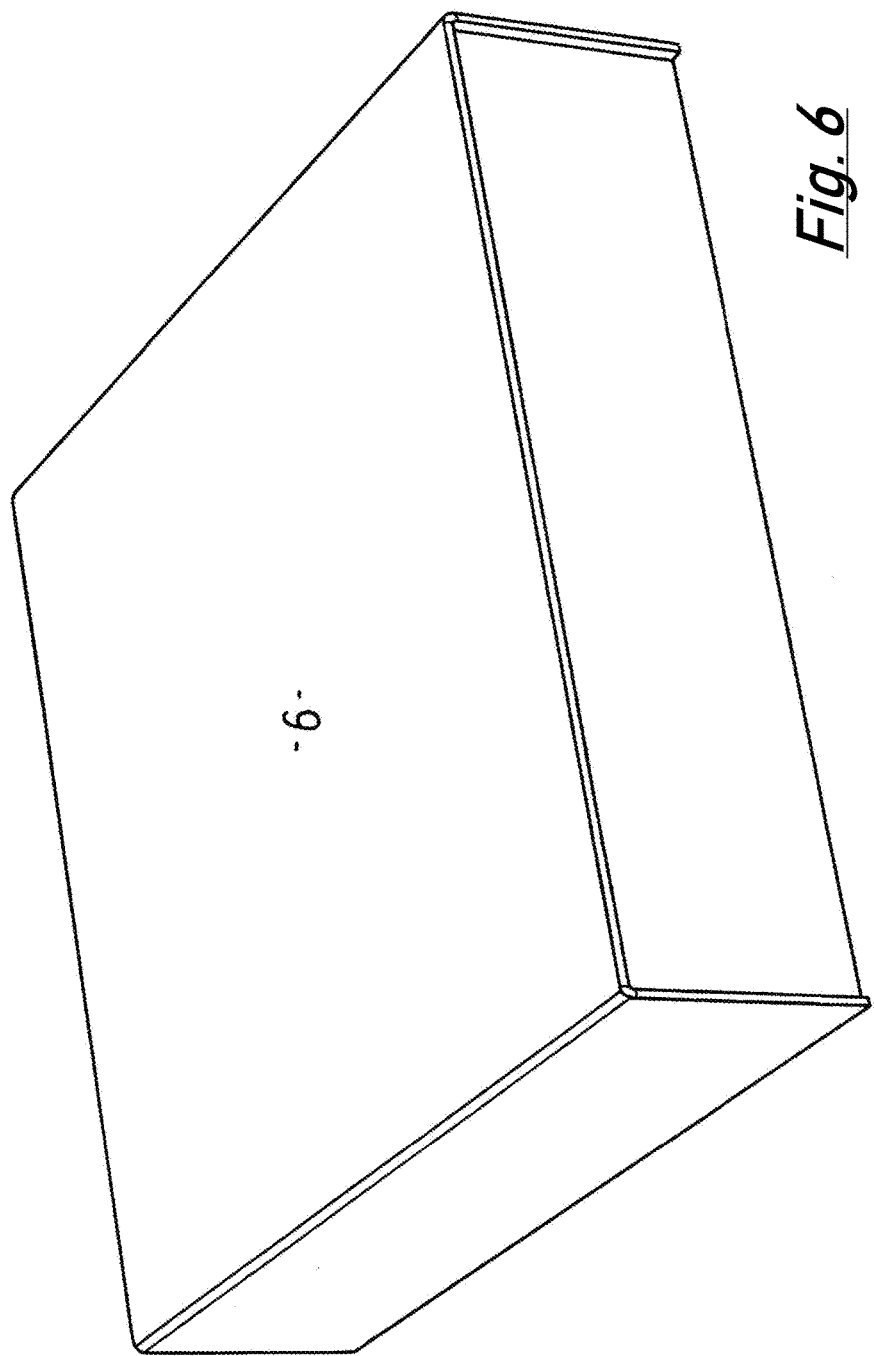
FIG. 6 shows a perspective view of a cash drawer unit comprising the cash drawer of FIGS. 1, 2 and 4.
Figure 7:
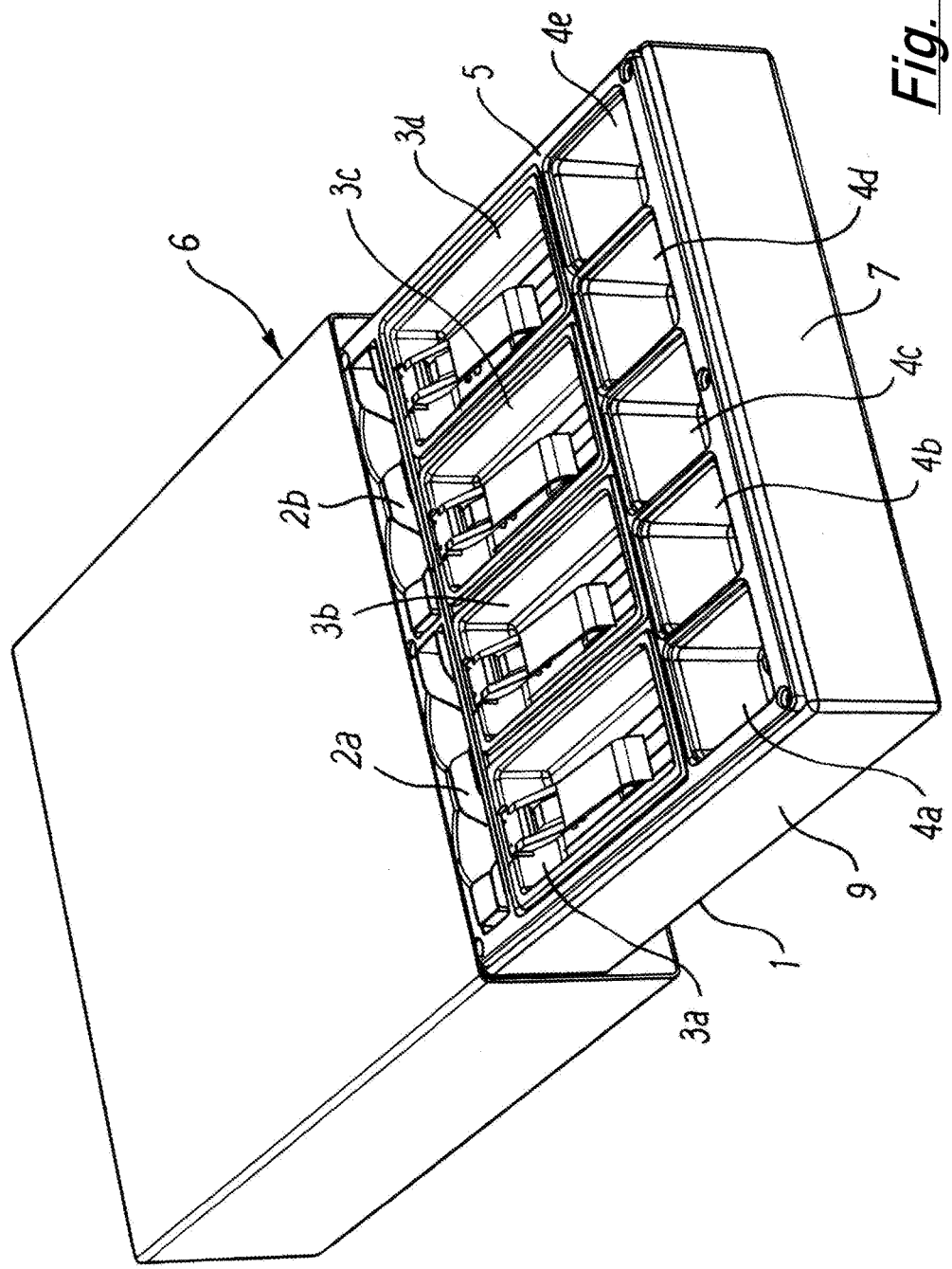
FIG. 7 shows a perspective view of the cash drawer unit of FIG. 6 with the cash drawer open.

With reference to the figures, in particular FIG. 1, a cash drawer 1 is provided with a number of cups 2a, 2b, 3a, 3b, 3c, 3d, 4a, 4b, 4c, 4d, 4e arranged within a tray 5. The cash drawer 1 is intended to be held in a slidable cradle, so as to slide in and out of a cash drawer unit 6 (shown in FIGS. 6 and 7) for use with a separate EPOS (not shown), but could equally slide out of an integrated cash register (not shown), or be provided in a cash drawer unit having a flip top lid as a separate flip-top cash drawer unit. The cash drawer has a front 7 which advances foremost, sliding out of the cash drawer unit 6 and a rear 8, which is closest to the housing of the cash drawer unit 6 when the drawer slides out. The drawer 1 has two sides 9 and a base 10; the top being open to allow currency to be placed in cups 2a, 2b, 3a, 3b, 3c, 3d, 4a, 4b, 4c, 4d, 4e, which form part of the weighing module.

The casing of the cash drawer 1 of this embodiment of the present technology is in metal, but of course other suitable materials are available (metal has the advantage of shielding components (e.g. load cells and the PCB discussed below) from electrical noise). Various mechanisms for carrying the cash drawer 1 and sliding it out of the cash register 6 will be well known to those skilled in the art, so they are not described in any detail here. The tray 5 and cups 2a, 2b, 3a, 3b, 3c, 3d, 4a, 4b, 4c, 4d, 4e of weighing module in this embodiment are formed from ABS plastic material, e.g. by injection moulding, but of course, other plastics materials, or even other different non-plastics materials could be used.

As can be seen most easily from FIG. 1, the cups 2a, 2b, 3a, 3b, 3c, 3d, 4a, 4b, 4c, 4d, 4e are not all the same and their arrangement in the cash drawer 1 has been carefully determined. Towards the rear 8 of the cash drawer 1 two vertical note cups 2a, 2b are provided. These vertical note cups 2a, 2b are intended and designed to receive notes with their plane substantially vertical, having their long axes horizontal and their short axes vertical. Consequently, the vertical note cups 2a, 2b are taller than they are wide and longer than they are tall. The vertical note cups 2a, 2b have their long axes extending parallel to the front and rear of the cash drawer.

Each vertical cup 2a, 2b has a pair of cut-outs 26 at the upper end of each of its long sides, to aid the user in pulling out notes.

One vertical note cup 2a is arranged at the rear of the cash drawer 1 on the left hand side, with the other vertical note cup 2b arranged on the right hand side. Their long axes are co-linear. The vertical note cups are intended to receive high-value denominations of banknotes, for example, $50 notes may be placed in the left hand vertical note cup 2a and $100 notes in the right hand vertical note cup 2b. Indicia may be provided on the vertical note cups 2a, 2b, or adjacent to the vertical note cups 2a, 2b, on the tray 5 to indicate the notes intended to be received. It is, of course, vital to accurately recording the value of notes in the cash drawer 1 that the user places currency in the correct cup.

Forward of the vertical note cups 2a, 2b, four prone note cups 3a, 3b, 3c, 3d are provided. Each prone note cup 3a, 3b, 3c, 3d is a note cup intended and designed to receive notes lying flat (with their plane substantially horizontal). Each prone note cup 3a, 3b, 3c, 3d comprises a clip 11 to clip down the notes. The construction of clips is well known to those skilled in the art and hence not described here in detail.

The prone note cups 3a, 3b, 3c, 3d are arranged parallel to one another and to the sides 8, with their long axes running perpendicular to the front 7 and rear 8 of the cash drawer 1. The prone note cups are intended to receive lower value banknotes, and they, or the tray, may be provided with indicia noting which notes they are intended to receive. For example $1 bills may be housed in the leftmost cup 3a, with $5 bills in the cup 3b to the right of it, $10 bills in the right-of-centre cup 3c and $20 bills in the rightmost prone note cup 3d. No provision is made for $2 bills as they are very rarely used.

Towards the front 7 of the cash drawer 1, five coin cups 4a, 4b, 4c, 4d, 4e are provided. The coin cups are intended and designed to receive coins. Unconventionally, these coin cups 4a, 4b, 4c, 4d, 4e are less wide than the prone note cups 3a, 3b, 3c, 3d in front of which they are arranged, and they are not arranged in in line with respective prone note cups 3a, 3b, 3c, 3d. The width of the coin cups 4a, 4b, 4c, 4d, 4e is determined such that when they are arranged in the tray 5, their total width (i.e. from the extreme left hand side of the left-most coin cup 4a to the extreme right hand side of the right-most coin cup 4e) is substantially equal to the total width of the prone note cups 3a, 3b, 3c, 3d (i.e. from the extreme left hand side of the left-most prone note cup 3a to the extreme right hand side of the right-most prone note cup 3d). The coin cups are intended to each receive a specific denomination of coin and the tray 5 may be provided with indicia showing for example 1 cent in the leftmost coin cup 4a, 5 cent in the next leftmost cup 4b, 10 cent in the central cup 4c, 50 cent in the centre-right cup 4d, and $1 in the far right coin cup 4e.

The height of the vertical note cups 2a, 2b is substantially equal to the height of the coin cups 4a-4e, and is in the region of 2.64 inches (67 mm) internally, compared to 2.17 inches (55 mm) for the coin cup (internally), whilst the height of the prone note cups 3a-3d is shallower, e.g. 1.26 inches (32 mm) internally. Those skilled in the art will of course realise that this is merely one suitable size and that in light of this description, appropriate height can be determined by reference to the height of notes intended to be stored in the vertical note cups and by trial and error if necessary.

Figure 3:
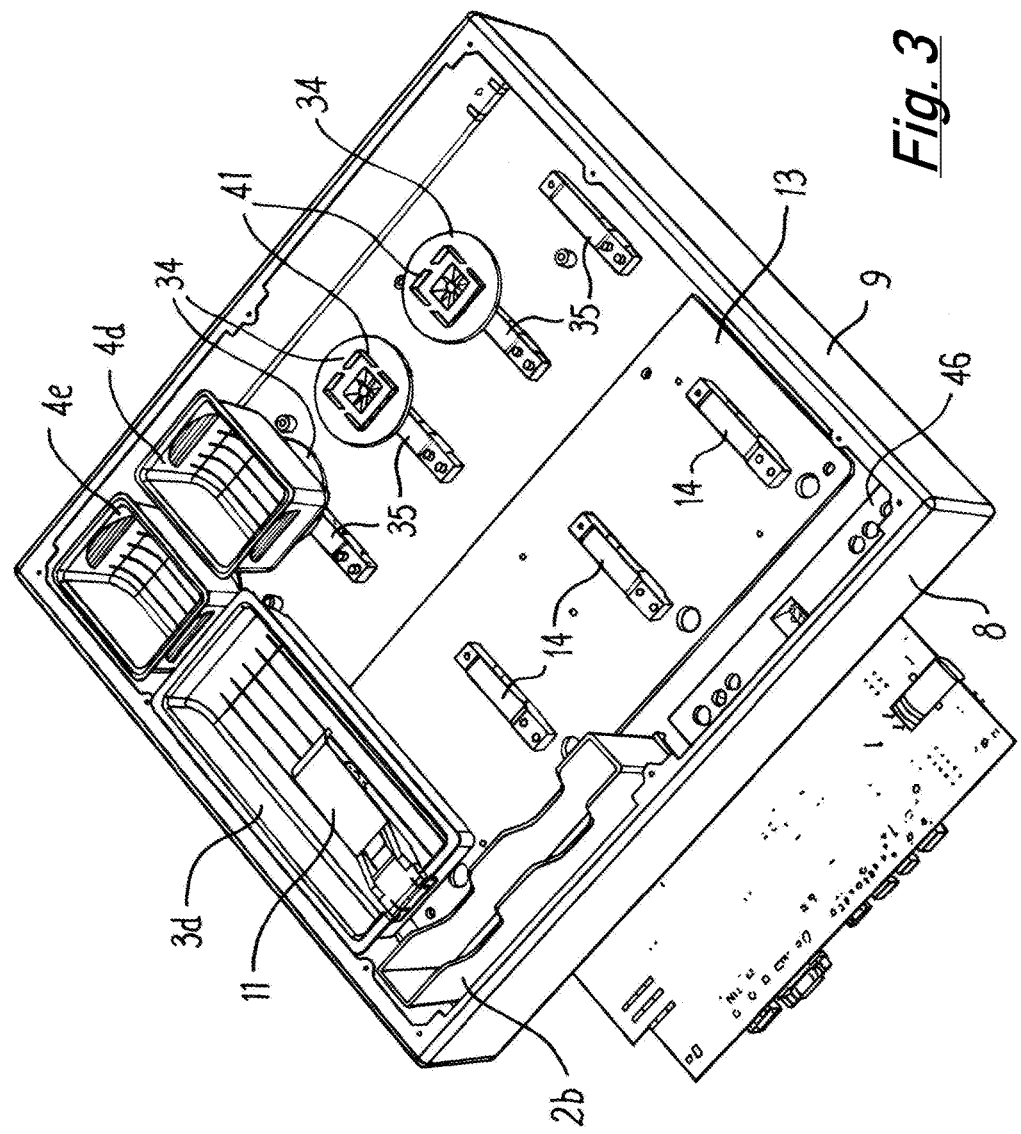
FIG. 3 shows a rear perspective view of the cash drawer of FIGS. 1 and 2 with further cups and the tray not shown.
Figure 4:
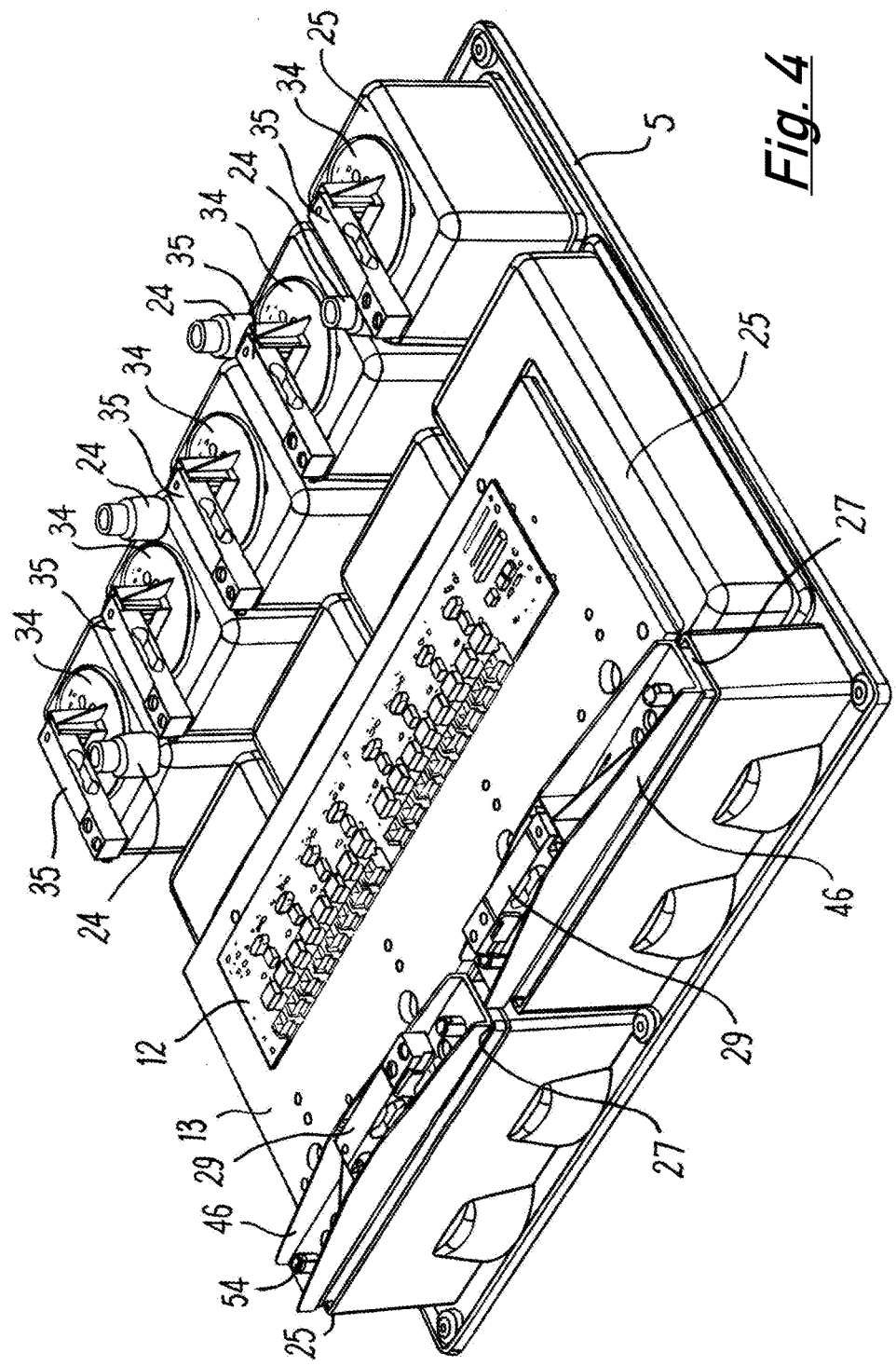
FIG. 4 shows an underneath perspective view of the weighing module of the cash drawer of FIGS. 1 to 3.

As shown in FIG. 4, since the prone note cups 3a-d need not be as high as the vertical note cups 2a, 2b or the coin cups 4a-e, the tray 5 in which they are housed can be shallower in the region of the prone note cups 3a-3d. Accordingly, other components of the weighing module, such as the analogue-to-digital converter (ADC) 12 can be housed beneath a plinth 13, on which load cells 14 (see FIGS. 2 and 3) for the prone note cups 3a-3d are provided.

The prone note cups 3a-d of this embodiment are immovably attached to their respective load cells 14 in the conventional manner (not shown), because their shape, their position in the drawer 1 and the way in which notes are introduced and removed from them (in particular the orientation of the notes) means they are less likely to be pulled. However, they could be secured in a manner similar to that of the vertical note cups 21, 2b, or the coin cups 4a-e as discussed below.

Figure 2:
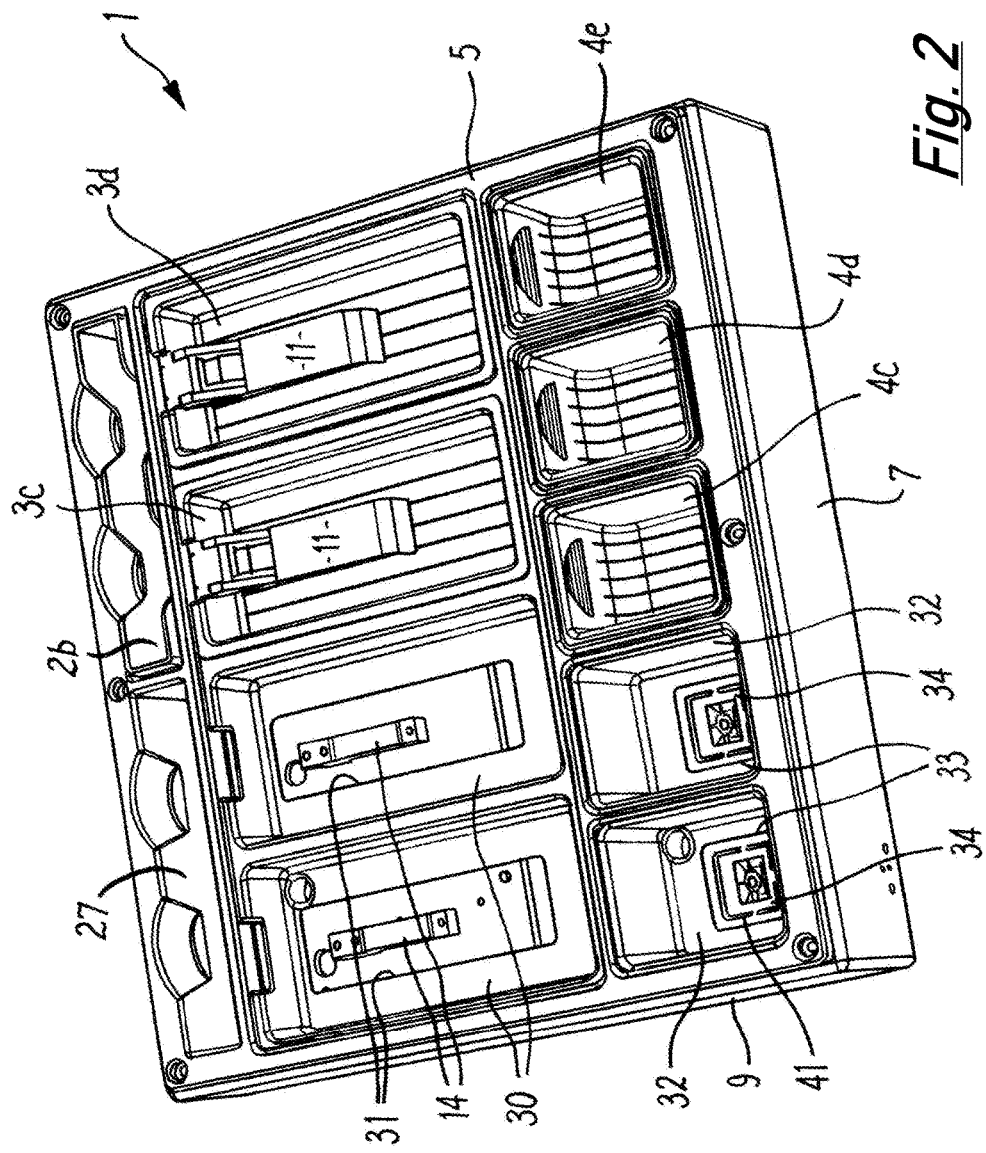
FIG. 2 shows another perspective view of the cash drawer of FIG. 1, but with certain cups removed.
Figure 5:
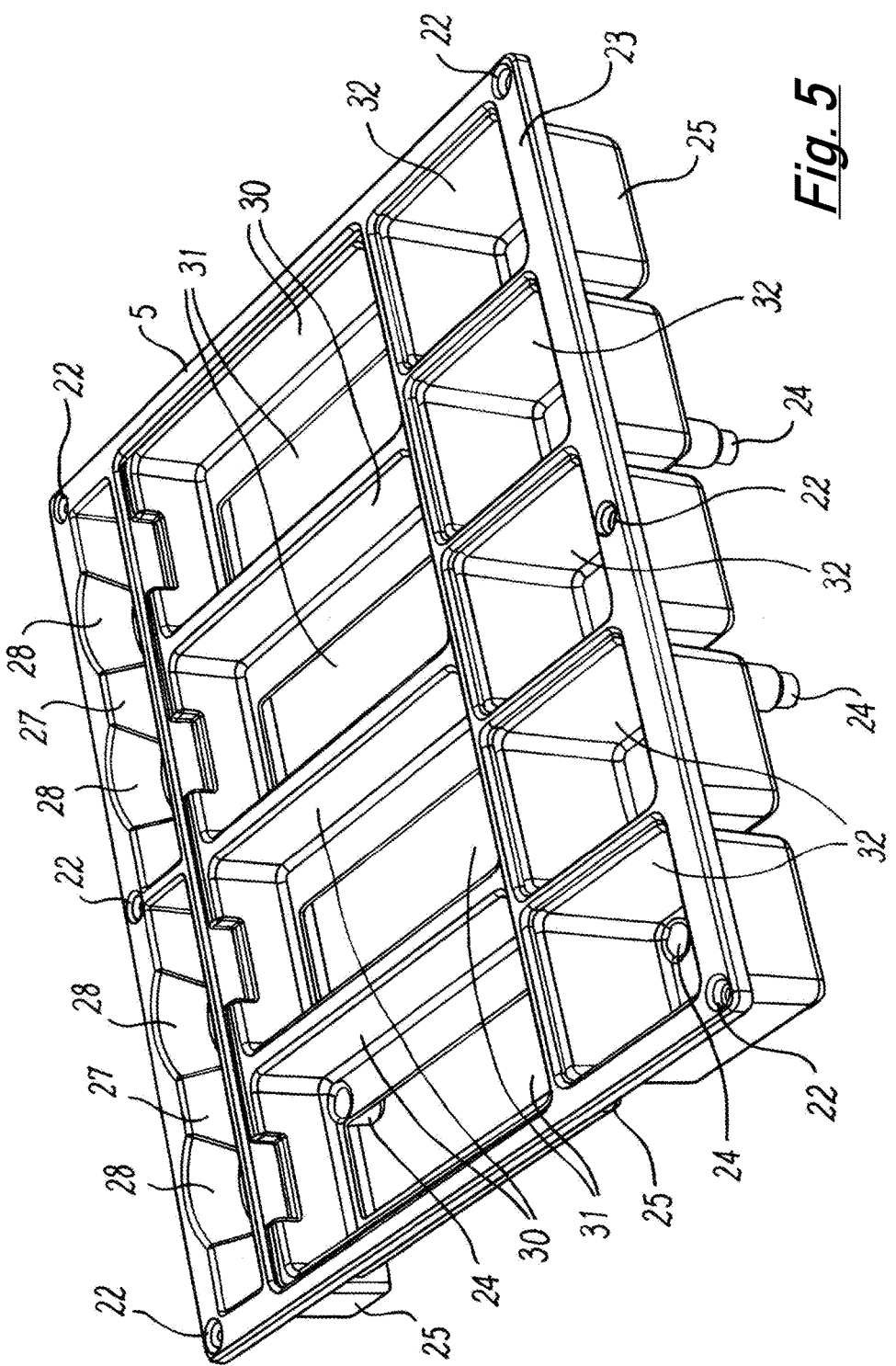
FIG. 5 shows a perspective view of the tray of the cash drawer of FIGS. 1, 2 and 4.

The arrangement of the cups 2a-b, 3a-d, 4a-e in the drawer 1 is determined by the tray 5 visible in FIGS. 1, 2 and 4 and shown isolated in FIG. 5. The tray 5 is secured to the casing of the cash drawer 1 via (preferably tamper proof) fastenings, which secure the tray at fastening points 22 which in this embodiment are provided in an upper surface 23 its corners and arranged centrally towards the front and the rear. The tray 5 is also provided with feet 24, which space its lower surface 25 from the bottom of the casing of cash drawer 1, in order that the analogue-to-digital converter (ADC) 12, or any other parts of the weighing module may be arranged beneath the tray 5.

The tray 5 comprises a plurality of cavities extending between the upper surface 23 and the lower surface 25, the cavities being sized, shaped and arranged to receive the cups 2a-b, 3a-d, 4a-e.

Consequently, at the rear, two co-linear long, deep and narrow cavities 27 are provided. These cavities 27 each have a substantially rectangular lateral cross section, with co-linear long axes, each slightly longer than the length of the vertical note cups 2a, 2b and slightly wider than the width of those vertical note cups 2a, 2b. The long axes of the cavities 27 extend laterally across the tray 5, parallel with the front and rear of the cash drawer 1. Recesses 28 are provided in the rear surfaces of the long, deep and narrow cavities 27, which correspond in location to the cut outs 26 in the cups 2a, 2b, so that notes can be more easily removed from the vertical note cups 2a, 2b.

In this embodiment, the cavities 27 for the vertical note cups 2a, 2b are slightly less deep than the height of the vertical note cups 2a, 2b, so that the vertical note cups 2a, 2b extend slightly out of the top. As most easily seen from FIG. 4, the bottom of the cavities 27 for the vertical note cups 2a, 2b are open, (i.e. an aperture is provided across the entire base) to allow for the vertical note cups 2a, 2b to be supported via holders (discussed below) on load cells 29.

As a result of the slightly larger size of the narrow cavities 27 than the vertical note cups 2a, 2b, when the note cups 2a, 2b are installed, there is always a gap between them and the tray 5.

Forward of the two co-linear long, deep and narrow cavities 27 for the vertical note cups 2a, 2b four further cavities 30 extend. These further cavities 30 once again have a rectangular cross section, but are long, shallow, and relatively wide compared to the narrow cavities 27. The long axis of each of the long, shallow and relatively wide cavities 30 extends perpendicular to the front 7 and rear 8 of the cash drawer, parallel to the sides 9.

Owing to their shallowness, the bottom surface 25 of the tray 5 in the regions of these shallow cavities 30 is higher than the bottom surface in the other regions. Consequently more space is provided under the tray 5 in this region and, as shown in FIG. 2, and shown best in FIGS. 3 and 4, a plinth 13 is provided, on the underneath of which is an ADC 12 (provided on a PCB), and on the upper side of which the load cells 14 for the prone note cups 3a-3d are provided.

As will of course be recognised, these shallow cavities 30 are each sized, shaped and arranged to receive one of the prone note cups 3a-d and in consequence, are each slightly longer and slightly wider than the prone note cups 3a-d. Each shallow cavity 30 has an aperture 31 in its base through which, as best seen in FIG. 2, the load cells 14 for the prone note cups 3a-3d extend. The prone note cups 3a-3d are attached to the load cells 14 in a manner whereby they will not touch the sides, or the bottom of the cavities 30 in use.

Forward of the shallow cavities 30, between their front ends and the front of the tray 5, five further cavities 32 are provided, each intended to receive a coin cup 4a-e. These coin-cup-cavities 32 are relatively deep, being of slightly greater depth than the main body of coin cups 4a-e, and each is slightly longer and wider than a coin cup 4a-e, such that once installed in respective cavities, the top of the coin cups 4a-e are substantially flush with the upper surface 23 of the tray 5, but in ordinary use, the cups 4a-e do not touch the sides of the cavity. Again an aperture 33 is provided in each cavity (best seen in FIG. 2), through which the base of each coin cup 4a-e is removably attached to a respective coin cup holder 34 best shown in FIG. 4, so as to be supported on a respective load cell 35 as discussed in greater detail below.

It will be appreciated that the cups 2a, 2b, 3a, 3b, 3c, 3d, 4a, 4b, 4c, 4d, 4e are completely isolated from the cavities 27, 30, 32 in which they are arranged and in use do not touch any part of the tray 5. Any touching between cup 2a, 2b, 3a, 3b, 3c, 3d, 4a, 4b, 4c, 4d, 4e and cavity 27, 30, 32 would cause incorrect operation of the respective load cells 14, 29, 35 and inaccurate readings to be delivered from them.

Accordingly, the reliability and consistency of the interface between the movable cups 2a, 2b, 4a-e and the load cells 29, 35 which weigh them, is of importance. As set out above, the prone note cups 3d are immovably attached to the load cells 14 which support them, so misalignment on the load cell 14, or movement to touch the tray 5 is not a concern.

Figure 8:
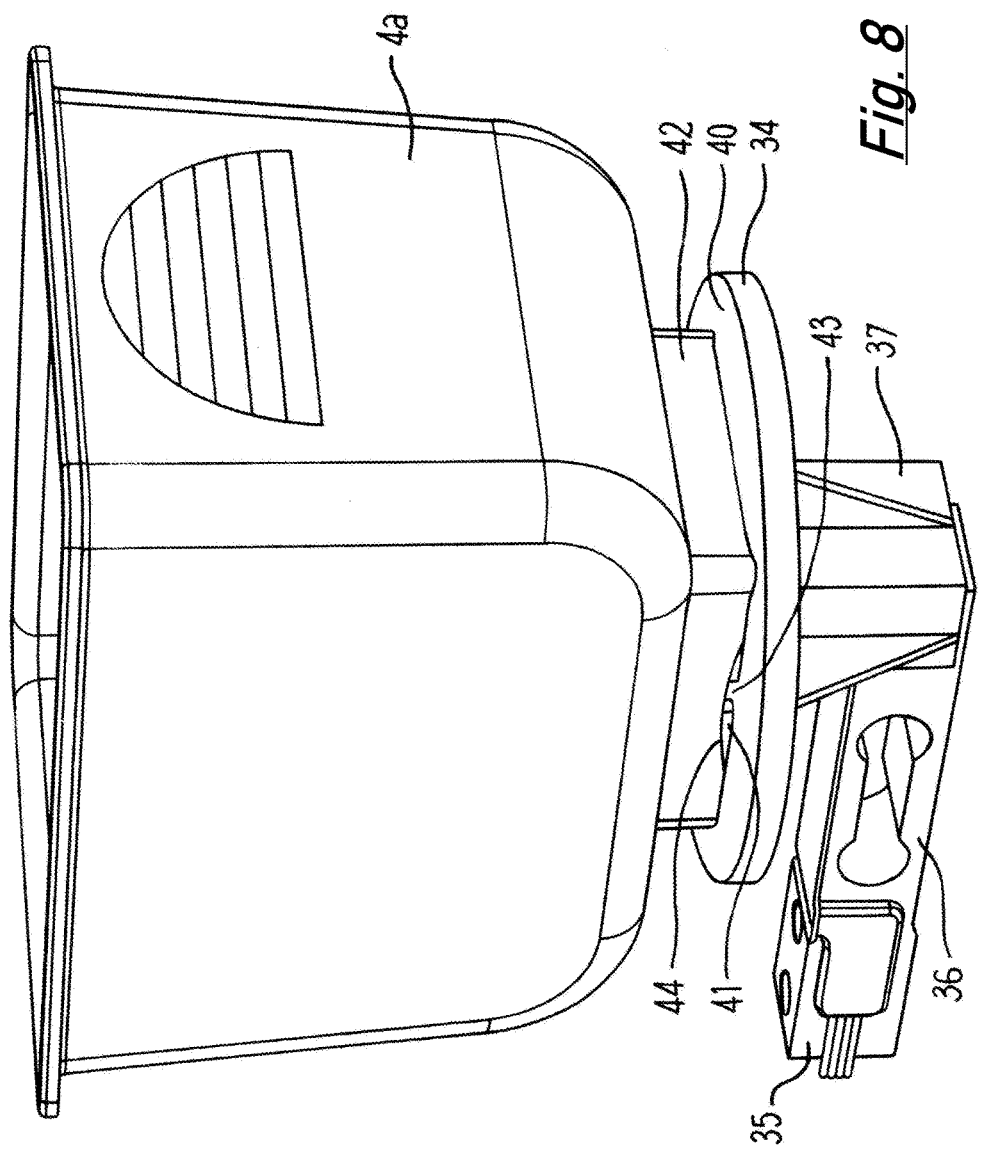
FIG. 8 shows a front perspective view of a coin cup, its load cell and the interfacing coin cup holder, of the weighing module of the cash drawer of FIG. 1 in the absence of other components.
Figure 9:
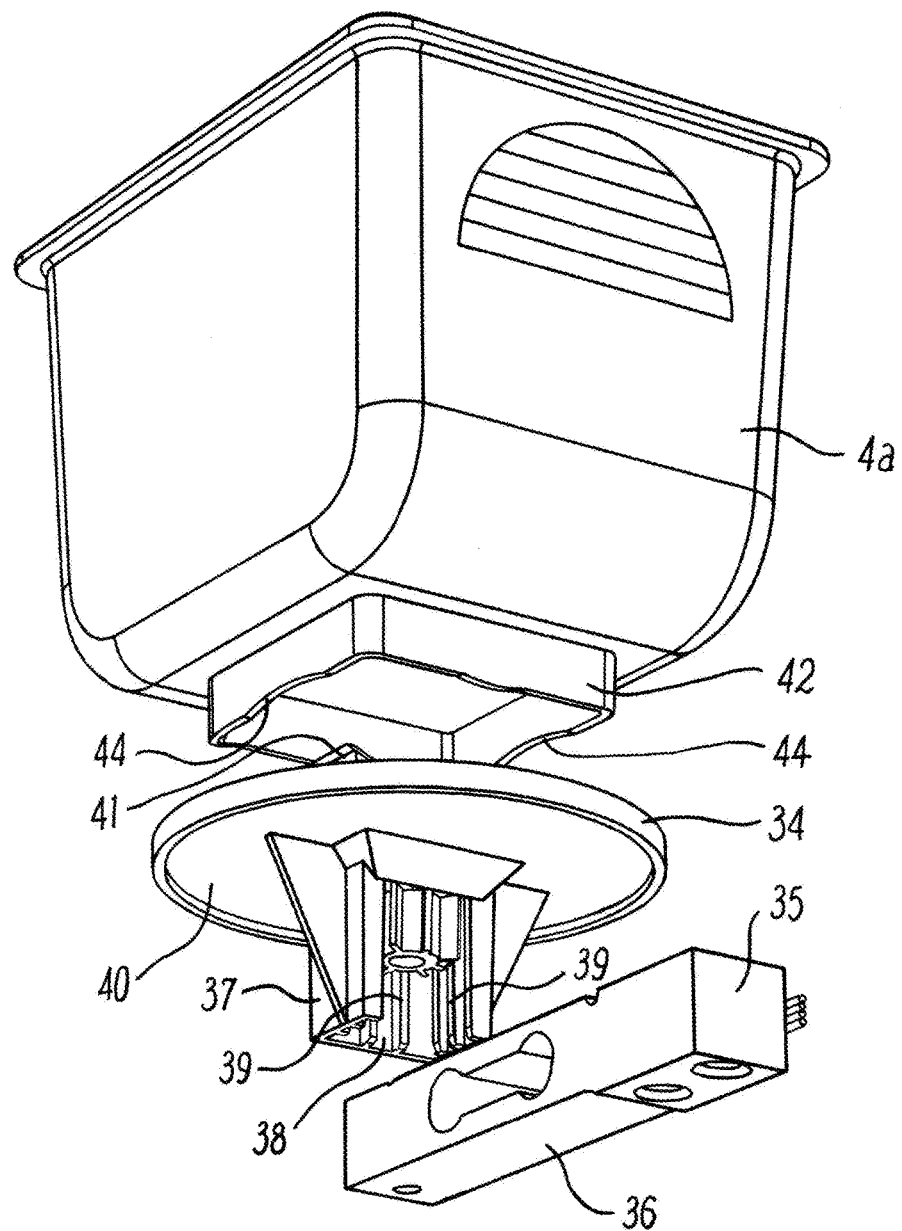
FIG. 9 shows a rear perspective exploded view of the coin cup, its load cell and the interfacing coin cup holder of FIG. 8.
Figure 10:
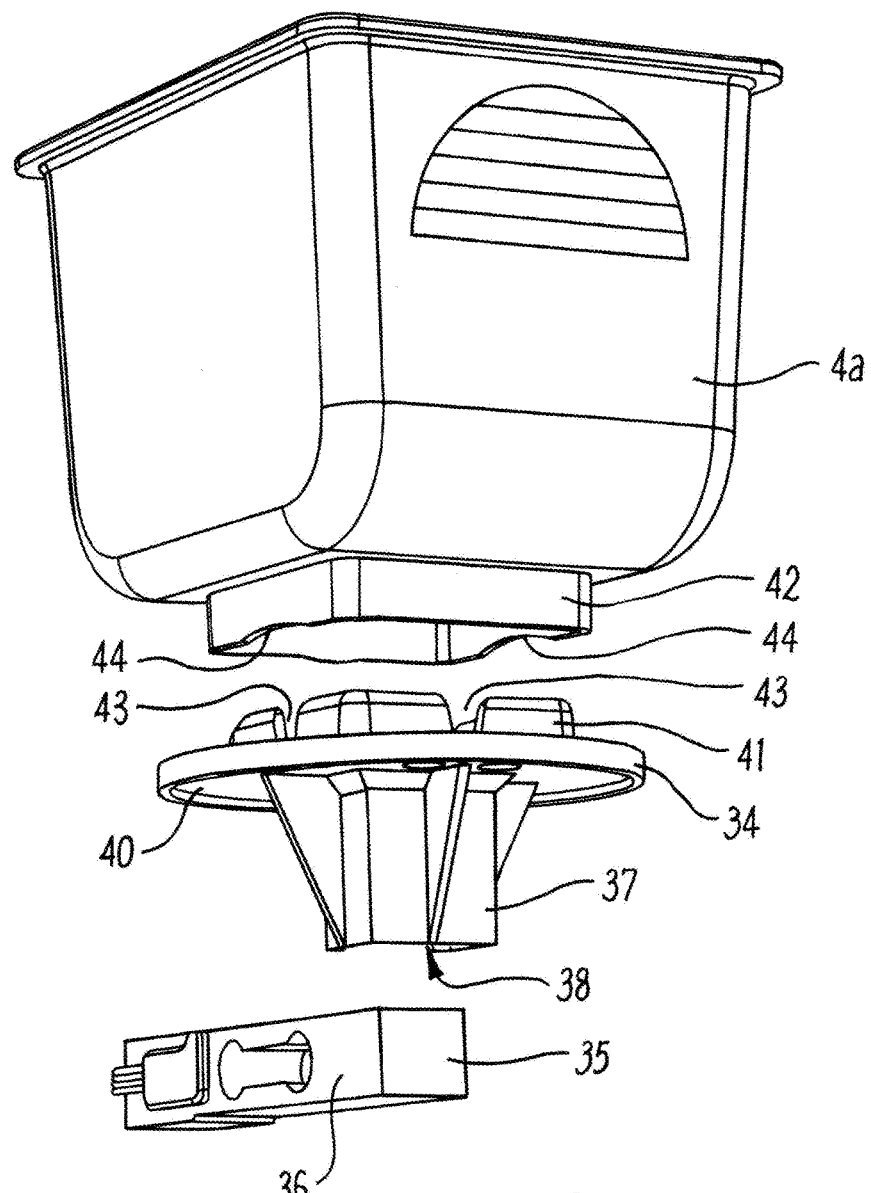
FIG. 10 shows a front perspective exploded view of the coin cup, its load cell and the interfacing coin cup holder of FIGS. 8 and 9.

The coin cups 4a-e, on the other hand, are not only movable with respect to the load cells 35, on which they are supported, but removable from them. Consequently, as described with reference to FIGS. 8-10 an arrangement is provided which ensures that each coin cup 4a-e is reliably and consistently aligned on its respective load cell 35.

Load cells 35 are conventional strain gauge load cells and not described in detail (obviously other types of load cells could be used). As is normal, they each comprise a beam 36 that deforms when weight is applied, changing the resistance, so that a different output is supplied to the ADC 12. It is essential that weight bears consistently in the same place on the beam 36. Accordingly, a coin cup holder 34 is provided between each coin cup 4a-e and its respective load cell 35. Each coin cup holder 34 comprises a load-cell attachment portion 37 sized and shaped for permanent attachment to the free end of the beam 36 of the load cell 35. The beam 36 in this embodiment is generally cuboid, so load cell attachment portion 37, is therefore provided with a generally cuboid space 38 having two open sides, which fits to the end of the beam. The generally cuboid space of this embodiment is provided with aligning ribs 39 to ensure precise alignment, such that the platform 40 from which the load-cell attachment portion 37 depends is exactly parallel with the plane of the upper side of the beam 36 of the load cell 35.

The coin cup holder 34 is fixedly attached (via the load-cell attachment portion 37) in the same manner as a coin cup would be conventionally permanently attached; for example with adhesive or a bolt and washer (not shown).

Whilst the load-cell attachment portion 37 of the coin cup holder 34 depends from the underside of the platform 40, the upper side of the platform 40 is provided with a formation 41 which mates with a corresponding formation 42 on the base of each coin cup 4a-e. The shapes and sizes of the mating formations 41, 42 are designed such that there is a close fit between each coin cup 4a-e and its respective coin cup holder 34; the fit being a transition fit or light interference fit. In the present embodiment, each formation 41 on the upper side of the platform 34 is generally square and the platform 40 itself is generally circular. The shape of the platform 40 may easily be changed with little or no effect, and the shape of the formation 41 is readily changeable provided that it interfaces accurately with the corresponding formation 42 on the base of the coin cup 4a-e. The formation 42 on the base of the coin cup 4a-e is, therefore, also square, forming a square recess sized to receive the formation 41 on the coin cup holder 34 as a transition or light interference fit. The recess formed by the formation 42 is deeper than the height of the formation 41, consequently, the base of the formation 42 bears on the platform 40, and accordingly, it is important that the base of the formation 42 is accurately perpendicular to the axis of the coin cup 4a-e which will be substantially vertical in use, because that bearing surface defines the orientation of the cup 4a-e relative to the coin cup holder 34 (hence to the load cell 35, hence to the weighing module, hence to the drawer 1 as a whole). In this embodiment, gaps 43 are provided between parts of the upstanding formation 41, and depressions 44 are formed in the underside of the formation 42; this allows air to escape from within the formations, so as to aid attachment and removal of the coin cup 4a-e from the coin cup holder 34.

The platform 40 sits beneath the aperture 33 in the tray 5 (as shown in FIG. 2), with the formations 41, 42 extending through the aperture 33, so that the main body of the coin cup 4a remains above the base of its respective cavity 32. Of course, the height of the formations 41, 42 is determined such that even with a full load, there will always be a gap between the cup 4a-e and the cavity 32.

In this embodiment, each coin cup 4a-e has the same shaped formation 42 on its base and can therefore be used on any cup holder 34. With such interchangability, it is important that the coin cups each weigh the same (e.g. 33.6 g+/−0.3 g), in order that they can be replaced in different positions without the need for recalibration.

As best understood from FIGS. 11-13, the vertical note cups 2a, 2b are movable with respect to the load cells 29 on which they are supported, but not removable from those load cells 29.

Consequently, an arrangement is provided which ensures that each vertical note cup 2a, 2b is reliably and consistently aligned on its respective load cell 29.

Load cells 29 are also conventional strain gauge load cells and not described in detail (obviously other types of load cells could be used). As is normal, they each comprise a beam 45 that deforms when weight is applied, changing the resistance, so that a different output is supplied to the ADC 12. It is essential that weight bears consistently in the same place on the beam 45. Accordingly, a vertical note cup holder 46 is provided between each vertical note cup 2a, 2b and its respective load cell 29. Each vertical note cup holder 46 comprises a load-cell attachment portion 47 sized and shaped for permanent attachment to the free end of the beam 45 of the load cell 29. The beam 45 in this embodiment is again generally cuboid, so load cell attachment portion 47, is therefore provided with a generally cuboid space 48 having two open sides, which fits to the end of the beam. The generally cuboid space of this embodiment is provided with aligning ribs 49 to ensure precise alignment, such that the platform 50 from which the load-cell attachment portion 47 depends is exactly parallel with the plane of the upper side of the beam 45 of the load cell 29.

The vertical note cup holder 46 is fixedly attached (via the load-cell attachment portion 47) in the same manner as a note/coin cup would be conventionally permanently attached and the same way as the coin cup holders 34 are attached to their respective load cells 35; for example with adhesive—or a bolt and washer (not shown).

Whilst the load-cell attachment portion 47 of the vertical note cup holder 46 depends from the underside of the platform 50, the upper side of the platform 50 of the vertical note holder has no formations and provides a flat surface on which the flat base 51 of each vertical note cup 2a, 2b can rest. Two apertures 52 extend through the platform 50 of the vertical note cup holders 46, arranged near each of its ends (the vertical note cup holder 46 being long and thin so as to match the shape of the underside of each vertical note cup 2a, 2b). Additional perforations 53 are also provided to allow access to the load cell fixing positions, in case any adjustment is required. Holes are provided on either side, in order to retain the symmetrical balance of the component.

Two projections 54 extend from the bottom of each vertical note holder 2a, 2b and in use, extend through the apertures 52 arranged near the ends of the vertical note cup holders 46. The interface between the projections 54 and the apertures 51, sets the alignment of the vertical note cups 2a, 2b on the vertical note cup holders 46, so that they cannot slide or twist laterally.

However, the vertical note cups 2a, 2b, are able to move vertically and to pivot to some extent out of the vertical plane, towards the horizontal, by a few degrees at least. Each projection is provided with a pair of clips 55 at its distal end (furthest from the base of the vertical note cup holder 2a, 2b), in order to limit vertical movement. The clips 55 are arrow-head shaped, so that they can squeeze inwards as the projections are introduced through the apertures 51, during assembly, but then return to their original shape and prevent the vertical note cups 2a, 2b being removed from the vertical note cup holders 50, whilst allowing the limited movement discussed above, which prevents the load cells 29 being pulled when the vertical note cups 2a, 2b are pulled to a certain degree.

The shape and size of the mating projections 54 and apertures 51 (and the location of the clips 55) is designed such that there is a close, but loose fit between each vertical note cup 2a, 2b and its respective vertical note cup holder 46; the fit allowing the sliding and pivoting mentioned above, whilst keeping the alignment. In the present embodiment, each aperture 51 and each projection 54 is generally circular, but of course that is not essential.

The entire underside of the vertical note cup 2a, 2b extends through the apertures in the bottom of the cavities 27 in the tray 5 (as shown in FIG. 4), so as to sit atop of the platform 50, parallel thereto, such that in normal use the vertical axis of the vertical note cup holder 2a is perpendicular to the axis of the load cell 29 (but can pivot slightly owing to the connection via the apertures 51 and projections 54, in the event that the vertical note cup 2a, 2b is pulled). Only a slight degree of pivoting is necessary, because after a few degrees, the vertical note cup 2a, 2b would come into contact with the wall of the cavity 27 preventing further pivoting. In normal use, with the bottom of the vertical note cups 2a, 2b sitting flush with the platform 50, the distance between the clips 55 and the bottom edge of the apertures 51 is in the region of 8 mm A relatively short distance, combined with the limited ability to pivot, means that when a pulling force is removed from the vertical note cups 2a, 2b, they will self-right, returning, naturally, to the correct vertical stance after being moved.

The cash drawer 1 is assembled by attaching the ADC PCB 12 to the base of the plinth 13 and connecting it to a communications module (not shown); connecting and attaching the load cells 29, 14, 35 via connections (not shown) and fixing them and the plinth 13 in position; then fixedly attaching the vertical note cup holders 46 to respective load cells 29 and coin cup holders 34 to respective load cells 35, before introducing the tray 5 into position and attaching it to the casing of the cash drawer 1 with tamper resistant fastenings. The cups 2a, 2b, 3a, 3b, 3c, 3d, 4a, 4b, 4c, 4d, 4e are then attached by pushing the vertical note cups 2a, 2b, onto their holders 46 such that they clip in; fixing (e.g. by adhering or with a bolt and washer) the prone note cups 3a-d to their load cells 14, and pushing the coin cups 4a-e into engagement with their respective holders 34.

With the cash drawer 1 calibrated in the conventional manner, and connected (e.g. directly or via the cloud) to an EPOS, it can then weigh the notes and coins placed into the cups 2a, 2b, 3a, 3b, 3c, 3d, 4a, 4b, 4c, 4d, 4e and determine (based on setting the denominations to be received in each cup 2a, 2b, 3a, 3b, 3c, 3d, 4a, 4b, 4c, 4d, 4e) the value of currency placed into the drawer 1 and transmit corresponding data to the EPOS (or any other connected device). Of course, data could be transmitted raw, as an indication of the weight in each cup 2a, 2b, 3a, 3b, 3c, 3d, 4a, 4b, 4c, 4d, 4e, or even the weight on each load cell 29, 14, 35, and the calculation of the value could be calculated on another device (e.g. an EPOS).

When the cash drawer unit 6 is opened, the cash drawer 1 will slide out front first, so the vertical note cups 2a, 2b intended for high-value denominations will be at the rear and most inconvenient to extract cash from, and if the coin cups 4a-e are pulled, they will not directly transmit that load to the load cell 35, but will disconnect from their holders 34; similarly, if the vertical note cups 2a, 2b are pulled forward they are able to pivot, and can even be pulled upward to a degree (although pulling forward is the more likely motion).

The above embodiment is described by way of example only. Many variations are possible without departing from the scope of the invention as defined in the appended claims.

What is claimed:

1. A cash drawer having a weighing module comprising a plurality of cups; wherein the cash drawer has a front and a rear; the cups arranged such that four prone note cups, five coin cups and two vertical note cups are provided;
   wherein the four prone note cups are arranged rearwards of the five coin cups and forwards of the two vertical note cups; and
   wherein the vertical note cups have a long axis extending parallel to the front and rear of the cash drawer.

2. The cash drawer of claim 1 wherein there are only four prone note cups.

3. The cash drawer of claim 2 wherein the prone note cups have a long axis running perpendicular to the front and rear of the cash drawer.

4. The cash drawer of claim 2 wherein there are only five coin cups.

5. The cash drawer of claim 4 wherein there are only two vertical note cups.

6. A weighing module for a cash drawer comprising a plurality of note cups and coin cups arranged on respective load cells, where at least some of the cups are movable relative to respective load cells on which they are arranged; and wherein each respective load cell on which a moveable cup is arranged is fixedly attached to a cup holder.

7. The weighing module of claim 6 further comprising a tray, the tray having cavities in which each cup is seated and apertures in the base, through which the cups are attached to their respective load cells.

8. A weighing module for a cash drawer comprising a plurality of note cups and coin cups arranged on respective load cells, where at least some of the cups are movable relative to respective load cells on which they are arranged; and further comprising a tray, the tray having cavities in which each cup is seated and apertures in the base, through which the cups are attached to their respective load cells;
   wherein the tray is arranged such that the cavities receive cups, and wherein each respective load cell on which a moveable cup is arranged is fixedly attached to a cup holder, wherein the cups do not touch the tray once seated on respective cup holders.

9. The weighing module according to claim 6 wherein at least some of the cups are removable from respective load cells.

10. The weighing module according to claim 9 wherein at least some of the removable cups are coin cups.

11. A weighing module for a cash drawer comprising a plurality of note cups and coin cups arranged on respective load cells, where at least some of the cups are movable relative to respective load cells on which they are arranged; wherein at least some of the cups are removable from respective load cells; and
   wherein the base of each removable cup has a formation mating with a formation on a respective coin cup holder which is fixedly attached to a respective load cell.

12. The weighing module according to claim 11 wherein the fit between the formations is a transition fit or an interference fit.

13. The weighing module according to claim 11 wherein each removable cup holder comprises a platform with a formation extending therefrom.

14. The weighing module of claim 11 wherein the formation on the coin cup holder fits within the formation on the coin cup.

15. A weighing module for a cash drawer comprising a plurality of note cups and coin cups arranged on respective load cells, where at least some of the cups are movable relative to respective load cells on which they are arranged; wherein at least one cup is movable relative to, but irremovable from its respective load cells.

16. The weighing module of claim 15 wherein one or more vertical note cup is movable relative to, but irremovable from its respective load cell.

17. The weighing module of claim 15 wherein the base of each irremovable cup is attached to, but movable relative to a respective cup holder.

18. The weighing module of claim 17 wherein each irremovable cup holder comprises a platform on which the cup may be seated, each cup holder having one or more aperture therethrough and the or each irremovable cup comprises one or more projections extending through the one or more apertures.

* * * * *